(12) United States Patent
Wang (10) Patent No.: US 11,314,239 B2
(45) Date of Patent: Apr. 26, 2022

(54) METHOD, DEVICE AND SYSTEM FOR REPLAYING MOVEMENT OF ROBOT

(71) Applicant: Siemens Aktiengesellschaft, Munich (DE)

(72) Inventor: Lu Wang, Qingdao (CN)

(73) Assignee: Siemens Aktiengesellschaft, Munich (DE)

( * ) Notice: Subject to any disclaimer, the term of this patent is extended or adjusted under 35 U.S.C. 154(b) by 353 days.

(21) Appl. No.: 16/351,641

(22) Filed: Mar. 13, 2019

(65) Prior Publication Data

US 2019/0294155 A1 Sep. 26, 2019

(30) Foreign Application Priority Data

Mar. 20, 2018 (EP) .................................. 18162704

(51) Int. Cl.
*G05B 19/42* (2006.01)
*B25J 9/16* (2006.01)
*G05B 23/02* (2006.01)
*G05B 19/4069* (2006.01)

(52) U.S. Cl.
CPC .......... *G05B 19/42* (2013.01); *B25J 9/1664* (2013.01); *B25J 9/1674* (2013.01); *G05B 19/4069* (2013.01); *G05B 23/0245* (2013.01); *G05B 2219/35291* (2013.01); *G05B 2219/40213* (2013.01)

(58) Field of Classification Search
None
See application file for complete search history.

(56) References Cited

U.S. PATENT DOCUMENTS

| | | |
|---|---|---|
| 9,811,074 B1 | 11/2017 | Aichele et al. |
| 2003/0090491 A1 | 5/2003 | Watanabe et al. |
| 2005/0071048 A1 | 3/2005 | Watanabe et al. |
| 2006/0009878 A1 | 1/2006 | Kobayashi et al. |

(Continued)

FOREIGN PATENT DOCUMENTS

| | | |
|---|---|---|
| CN | 1715010 A | 1/2006 |
| CN | 105759775 A | 7/2016 |

(Continued)

OTHER PUBLICATIONS

European Search Report with Application No. 18162704.3 dated Dec. 20, 2018.

(Continued)

*Primary Examiner* — Carlos R Ortiz Rodriguez
(74) *Attorney, Agent, or Firm* — Harness, Dickey & Pierce, P.L.C.

(57) ABSTRACT

The present disclosure discloses a method, system and device for replaying movement of a robot. In an embodiment, the method includes a controller receiving a log file in which information about a movement of the robot is recorded; the controller obtaining information of position points passed by the robot when performing the movement based on the log file; and the controller sending the information of position points passed by the robot when performing the movement to a replaying device, to enable the replaying device to replay the movement of the robot according to the information of position points. The technical solutions of the present disclosure may increase the accuracy of locating where the problem is when errors or something unexpected happened to the robot.

14 Claims, 3 Drawing Sheets

(56) References Cited

U.S. PATENT DOCUMENTS

| | | |
|---|---|---|
| 2009/0281659 A1 | 11/2009 | Wappling et al. |
| 2013/0226346 A1 | 8/2013 | Dreslinski et al. |
| 2017/0308057 A1 | 10/2017 | Kreidler |

FOREIGN PATENT DOCUMENTS

| | | |
|---|---|---|
| CN | 105785921 A | 7/2016 |
| CN | 106843000 A | 6/2017 |
| CN | 107102795 A | 8/2017 |
| EP | 1310844 A1 | 5/2003 |
| EP | 1518648 A2 | 3/2005 |
| EP | 1935578 A1 | 6/2008 |

OTHER PUBLICATIONS

Office Action for Chinese Patent Application No. 201910160527.3 dated Sep. 27, 2021.

METHOD, DEVICE AND SYSTEM FOR REPLAYING MOVEMENT OF ROBOT

PRIORITY STATEMENT

The present application hereby claims priority under 35 U.S.C. § 119 to European patent application number EP18162704.3 filed Mar. 20, 2018, the entire contents of which are hereby incorporated herein by reference.

FIELD

Embodiments of the present disclosure generally relate to trouble diagnose technologies. More particularly, embodiments of the present disclosure relates to a method, device and system for replaying movement of a robot.

BACKGROUND

Robots have been widely used in fields of manufacturing, healthcare services, home-entertainment business, military and space, and so on. The robot is not only important productive and service equipment in industry and non-industry, but also indispensable automatic device in advanced manufacturing technology.

A log is mostly used to store the problem information in production environment, and the log can be exported in a file format. When errors or something unexpected happened to the robot when the robot is working in a production line, an engineer may read the log, and use key parameters and other information in the log to find when and where the problem happened. However, only with the log, the engineer can hardly imagine the posture and the end position of the robot where the problem happened, so the engineer usually cannot find the position accurately where the problem happened in the real environment.

SUMMARY

The inventor has discovered that there is a need for finding an effective way to restore the scene and locate where the problem is. According to embodiments of the present disclosure, a method, device and system for replaying movement of a robot is provided to improve the accuracy of locating where the problem is when errors or something unexpected happened to the robot.

The method for replaying movement of a robot provided by an embodiment of the present disclosure includes: a controller receiving a log file in which information about a movement of the robot is recorded; the controller obtaining information of every position point passed by the robot when performing the movement based on the log file; and the controller sending the information of every position point passed by the robot when performing the movement to a replaying device, to enable the replaying device to replay the movement of the robot according to the information of every position point.

The method for replaying movement of a robot provided by another embodiment of the present disclosure includes: a replaying device receiving information of every position point passed by the robot when performing the movement from a controller; wherein the information of every position point passed by the robot when performing the movement is obtained by the controller based on a log file in which information about a movement of the robot is recorded; and the replaying device replaying the movement of the robot according to the information of every position point passed by the robot when performing the movement.

The device for replaying movement of a robot provided by an embodiment of the present disclosure may be the controller and the replaying device.

The controller provided by an embodiment of the present disclosure includes: a receiving unit, configured to receive a log file in which information about a movement of the robot is recorded; a classifying unit, configured to classify the information about the movement of the robot in the log file into at least one motion command class according to at least one motion command for controlling the robot to perform at least one motion in the information about the movement of the robot in the log file; and a controlling unit, configured to convert the at least one motion command into robot movement information about a movement trajectory with a start point and an end point, calculating information of every position point between the start point and the end point according to the robot movement information.

The replaying device provided by an embodiment of the present disclosure includes: a receiving module, configured to receive information of every position point passed by a robot when performing a movement from the controller; and a replaying module, configured to replay the movement of the robot according to the information of every position point obtained by the receiving module.

The system for replaying movement of a robot provided by an embodiment of the present disclosure includes: a log loader, a controller and a replaying device; wherein, the log loader is configured to obtain a log file in which information about a movement of the robot is recorded, and provide the log file to the controller; the controller is configured to obtain information of every position point passed by the robot when performing the movement based on the log file, and providing the information of every position point to the replaying device; and the replaying device is configured to replay the movement of the robot according to the information of every position point.

In another example, the device for replaying movement of a robot includes: a memory and a processor in communication with the memory; the memory stores a group of machine-readable instructions which may be executed by the processor to achieve the method for replaying movement of a robot.

A non-transitory computer readable storage medium having stored therein one or more instructions provided by an embodiment of the present disclosure, which, when executed by a computing device, cause the computing device to achieve the method for replaying movement of a robot.

The present disclosure will be described in further detail hereinafter with reference to accompanying drawings and examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

LIST OF REFERENCE NUMBERS

| reference numbers | meanings |
| --- | --- |
| 101~103, 201~202 | steps |
| 310 | Log loader |
| 320 | Controller |
| 321 | Receiving unit |
| 322 | Classifying unit |
| 333 | Controlling unit |
| 330 | Replaying device |
| 331 | Receiving module |
| 332 | Replaying module |
| 333 | Converting module |
| 410, 510 | memory |
| 420. 520 | processor |

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

The method for replaying movement of a robot provided by an embodiment of the present disclosure includes: a controller receiving a log file in which information about a movement of the robot is recorded; the controller obtaining information of every position point passed by the robot when performing the movement based on the log file; and the controller sending the information of every position point passed by the robot when performing the movement to a replaying device, to enable the replaying device to replay the movement of the robot according to the information of every position point.

The method for replaying movement of a robot provided by another embodiment of the present disclosure includes: a replaying device receiving information of every position point passed by the robot when performing the movement from a controller; wherein the information of every position point passed by the robot when performing the movement is obtained by the controller based on a log file in which information about a movement of the robot is recorded; and the replaying device replaying the movement of the robot according to the information of every position point passed by the robot when performing the movement.

The device for replaying movement of a robot provided by an embodiment of the present disclosure may be the controller and the replaying device.

The controller provided by an embodiment of the present disclosure includes: a receiving unit, configured to receive a log file in which information about a movement of the robot is recorded; a classifying unit, configured to classify the information about the movement of the robot in the log file into at least one motion command class according to at least one motion command for controlling the robot to perform at least one motion in the information about the movement of the robot in the log file; and a controlling unit, configured to convert the at least one motion command into robot movement information about a movement trajectory with a start point and an end point, calculating information of every position point between the start point and the end point according to the robot movement information.

The replaying device provided by an embodiment of the present disclosure includes: a receiving module, configured to receive information of every position point passed by a robot when performing a movement from the controller; and a replaying module, configured to replay the movement of the robot according to the information of every position point obtained by the receiving module.

The system for replaying movement of a robot provided by an embodiment of the present disclosure includes: a log loader, a controller and a replaying device; wherein, the log loader is configured to obtain a log file in which information about a movement of the robot is recorded, and provide the log file to the controller; the controller is configured to obtain information of every position point passed by the robot when performing the movement based on the log file, and providing the information of every position point to the replaying device; and the replaying device is configured to replay the movement of the robot according to the information of every position point.

In another example, the device for replaying movement of a robot includes: a memory and a processor in communication with the memory; the memory stores a group of machine-readable instructions which may be executed by the processor to achieve the method for replaying movement of a robot.

A non-transitory computer readable storage medium having stored therein one or more instructions provided by an embodiment of the present disclosure, which, when executed by a computing device, cause the computing device to achieve the method for replaying movement of a robot.

It can be seen from the foregoing technical solutions that, in the implementation manners of the embodiments of the present disclosure, the concept of replaying the movement of the robot is introduced, namely a replaying device, for example, a digital twin device is used to replay the historical movement of the robot based on robot historical data i.e. the information of every position point passed by the robot when performing the movement, and a controller, for example, a PLC is used to obtain the information of every position point based on a log file in which information about movement of the robot is recorded. With the visual simulation, the engineer can see where the robot end point is and what current robot posture is with every input data, so that the accurate time and position where the error or something unexpected happened to the robot may be located, namely, the accuracy of locating where the problem is may be improved.

In the present disclosure, in order to improve the accuracy of locating where the problem is when errors or something unexpected happened to the robot, the concept of replaying the movement of the robot is introduced. A replaying device, for example, a digital twin device which is in simulated mode can do the simulation based on robot historical data stored in robot production process. With the visual simulation, the engineer can see where the robot end point is and what current robot posture is with every input data, so that the accurate time and position where the error or something unexpected happened to the robot may be located. The robot historical data may be obtained from a log file in which information about a movement of the robot is recorded, and the log file may be stored in the controller side of the robot, and in order to provide useful information in the log file to the replaying device, the present disclosure further adopts a controller, for example, a Programmable Logic Controller (PLC) to obtain information required by the replaying device for replaying the robot historical movement from the log file.

Figure 1:
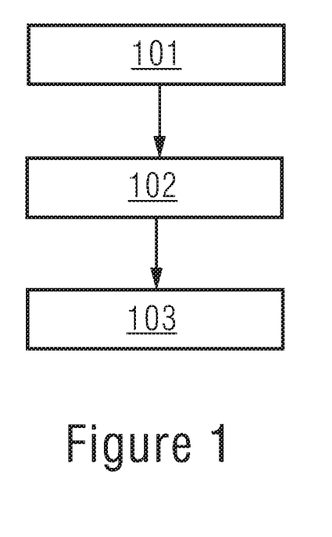
FIG. 1 is a flowchart illustrating a method for replaying movement of a robot according to an embodiment of the present disclosure.

FIG. 1 is a schematic diagram illustrating a method for replaying movement of a robot according to an embodiment of the present disclosure. As shown in FIG. 1, the method is implemented in a controller, in the embodiment, it is taken for an example that the controller is a Programmable Logic Controller (PLC) and the replaying device is a digital twin device, and the method may include the following processes.

Block 101, the PLC receives a log file in which information about a movement of the robot is recorded.

In general, the log file is stored in structured format, and the log file may be stored in controller side of the robot. For example, the log file is stored in Extensible Markup Language (XML) or JavaScript Object Notation (JSON) format in controller side of the robot. The following shows part log data of a log file in XML format according to an example of the present disclosure.

```
<motion>
    <type>line</type>
    <velocity>25</velocity>
    <accelaration>100</accelaration>
    <jerk>500</jerk>
    <coordinate>MCS</coordinate>
    <start_point>100,100,100,10,10,10</start_point
    >
            <end_point>200,200,100,20,10, 10</end_point>
</motion>
<interpolation>
        <1 position=101,101,101,10,10,10 velocity=10
    accelaration=50 jerk=100></1>
            <2 position=102,101,101,10,10,10 velocity=11
    accelaration=51 jerk=100></2>
            <3 position=103,101,101,10,10,10 velocity=10
    accelaration=51 jerk=100></1>
        ......
        <N position=200,200,100,20,10,10 velocity=10
accelaration=51 jerk=100></1>
    </interpolation>
```

As can be seen from above mentioned example, the log data in the log file may include at least one motion command for controlling the robot to perform at least one motion, a motion type, a velocity, an acceleration, a jerk, a coordinate type, a start point and an end point corresponding to each motion command, and a coordinate position, a velocity, an acceleration and a jerk of the robot when moving to each position point between the start point and the end point. In an example, the position point may be interpolation point between the start point and the end point.

In an example of the present disclosure, a Log Loader may be used to obtain the log file, for example, load the log file stored in structured format in the controller side of the robot, and convert the log file from structured format to binary format, and then provide the log file in binary format to the PLC, and the PLC may store the log file in a data block in the PLC. That is to say, a receiving unit of the PLC may receive a log file in binary format from the Log Loader.

Block 102, the PLC obtains information of every position point passed by the robot when performing the movement based on the log file. The information of one position point may include: information of a coordinate position of the position point, and a velocity, an acceleration and a jerk of the robot when moving to the position point.

The following shows the information of position points between the start point and the end point shown in above mentioned log file according to the example of the present disclosure.

```
position=101,101,101,10,10,10 velocity=10
acceleration=50 jerk=100
    position=102,101,101,10,10,10 velocity=11
acceleration=51 jerk=100
    position=102,101,101,10,10,10 velocity=11
acceleration=51 jerk=100
    ......
    position=200,200,100,20,10,10      velocity=10
acceleration=51 jerk=100
```

In an example, the PLC may include an obtaining unit, which may directly obtain the information of every position point between a start point and an end point from the log file, for example, the log file stored in the data block of the PLC.

In another example, the PLC may include a classifying unit and a controlling unit, for example, a Control Kernel (CK), namely the Robot Control Kernel (RCK).

The classifying unit may classify the information about the movement of the robot in the log file into at least one motion command class according to at least one motion command for controlling the robot to perform at least one motion in the information about the movement of the robot in the log file. Each of the at least one motion command class may include: a motion type of the motion command, a velocity, an acceleration and a jerk of the robot when performing the motion command, a coordinate type, a start point and an end point of the motion. For example, the following shows one motion command class classified based on the log data in above mentioned log file according to the example of the present disclosure.

```
Class MotionCommand
{
    MotionType type;
    double velocity;
    double acceleration;
    double jerk;
    Coordinate coord;
    double[6] start_point;
    double[6] end_point;
}
```

The motion type may be a type of a movement trajectory generated when the robot performs the motion command, for example, the type of line, or the type of arc.

The controlling unit may convert the at least one motion command into robot movement information about a movement trajectory with a start point and an end point, and calculate information of every position point between the start point and the end point according to the robot movement information. For example, the following shows robot movement information based on above mentioned one motion command class according to the example of the present disclosure.

```
Class Line
{
    double[6] start_point;
    double[6] end_point;
    Trajectory trajectory;
}
```

Block 103, the PLC sends the information of every position point between a start point and an end point to a digital twin device, to enable the digital twin device to replay the historical movement of the robot according to the information of every position point.

In an example, the information of every position point sent by the PLC may be information of every position point in six-axis coordinates, for example, six-axis robot coordinates, when it is necessary for the digital twin device to convert the information of every position point in six-axis coordinates to information of every position point in Cartesian coordinates, the digital twin device may convert the information of every position point in six-axis coordinates to information of every position point in Cartesian coordinates, and then replay the historical movement of the robot according to the information of every position point in Cartesian coordinates. When it is not necessary for digital twin device to convert the information of every position point in six-axis coordinates to information of every position point in Cartesian coordinates, the digital twin device may directly replay the historical movement of the robot according to the information of every position point received from the PLC.

Figure 2:
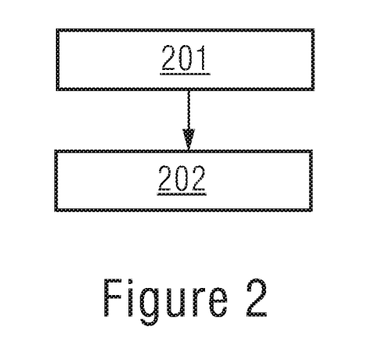
FIG. 2 is a flowchart illustrating a method for replaying movement of a robot according to another embodiment of the present disclosure.

FIG. 2 is a schematic diagram illustrating a method for replaying movement of a robot according to another embodiment of the present disclosure. As shown in FIG. 2, the method is implemented in a replaying device, in the embodiment, it is taken for an example that the controller is a Programmable Logic Controller (PLC) and the replaying device is a digital twin device, and the method may include the following processes.

Block 201, a digital twin device receives information of every position point passed by the robot when performing the movement from the PLC. The information of every position point passed by the robot when performing the movement is obtained by the PLC based on a log file in which information about a movement of the robot is recorded, and the information of one position point may include a coordinate position of the position point, a velocity, an acceleration and a jerk of the robot when moving to the position point, and so on.

The specific process for obtaining the information of every position point passed by the robot when performing the movement by the PLC may refer to the description about the blocks 101 to 102.

Block 202, the digital twin device replays the historical movement of the robot according to the information of every position point passed by the robot when performing the movement.

In an example, the information of every position point sent by the PLC may be information of every position point in six-axis coordinates, when it is necessary for the digital twin device to convert the information of every position point from six-axis coordinates to Cartesian coordinates, the digital twin device may convert the information of every position point in six-axis coordinates to information of every position point in Cartesian coordinates, and then replay the historical movement of the robot according to the information of every position point in Cartesian coordinates. When it is not necessary for digital twin device to convert the information of every position point from six-axis coordinates to Cartesian coordinates, the digital twin device may directly replay the historical movement of the robot according to the information of every position point received from the PLC.

The methods for replaying movement of a robot according to embodiments of the present disclosure have been described in detail, and the system and the device for replaying movement of a robot will be described in detail hereinafter, those particulars not been disclosed in the system and device embodiments may refer to the corresponding description in above mentioned method embodiments.

Figure 3:
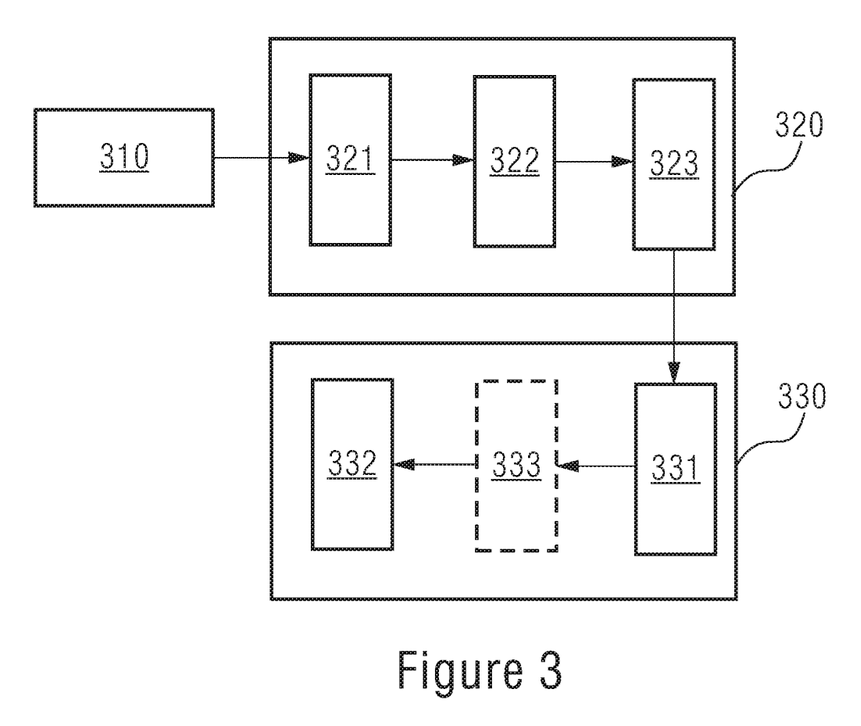
FIG. 3 is a schematic diagram illustrating a system for replaying movement of a robot according to an embodiment of the present disclosure.

FIG. 3 is a schematic diagram illustrating a system for replaying movement of a robot according to an embodiment of the present disclosure. As shown in FIG. 3, the system may include a log loader 310, a controller 320, and a replaying device 330.

The log loader 310 may receive a log file in which information about a movement of the robot is recorded, and provide the log file to the controller 320. For example, the log loader 310 may receive a log file in structured format of the robot, for example load the log file which is stored in structured format in controller side of the robot, convert the log file from structured format to binary format, and provide the log file in binary format to the controller 320.

The controller 320 may obtain information of every position point passed by the robot when performing the movement based on the log file, for example, information of every position point between a start point and an end point, and providing the information of every position point to the replaying device 330; wherein the information of one position point comprises: a coordinate position of the position point, a velocity, an acceleration and a jerk of the robot when moving to the position point.

The replaying device 330 may obtain the information of every position point, and replay the historical movement of the robot according to the information of every position point.

In practical application, the controller 320 may have different structure, for example, according to an example of the present disclosure, the controller 320 may include a obtaining unit, which may directly obtain the information of every position point passed by the robot when performing the movement, for example, information of every position point between a start point and an end point from the log file, for example, the log file stored in the data block of the PLC.

According to another example of the present disclosure, the controller 320 may, as shown in FIG. 3, include a receiving unit 321, a classifying unit 322 and a controlling unit 323.

The receiving unit 321 may receive the log file of the robot from the log loader 310.

The classifying unit 322 may classify the information about the movement of the robot in the log file into at least one motion command class according to at least one motion command for controlling the robot to perform at least one motion in the information about the movement of the robot in the log file; wherein each of the at least one motion command class comprises: a motion type of a motion command, a velocity, an acceleration and a jerk of the robot when performing the motion command, a coordinate type, a start point and an end point of the motion command, and so on.

The controlling unit 323 may obtain the at least one motion command class, convert the at least one motion command into robot movement information about a movement trajectory with a start point and an end point, calculating information of every position point between the start point and the end point according to the robot movement information.

In practical application, the replaying device 330 may have different structure, for example, according to an example of the present disclosure, the replaying device 330 may, as shown in FIG. 3, include a receiving module 331 and a replaying module 332.

The receiving module 331 may obtain the information of every position point from the controller 320, for example, from the controlling unit 323 of the controller 320. Wherein the information of every position point between the start point and the end point is obtained by the controller 320 based on a log file in which information about a movement of the robot is recorded, and the information of one position point comprises: a coordinate position of the position point, a velocity, an acceleration and a jerk of the robot when moving to the position point.

The replaying module 332 may replay the historical movement of the robot according to the information of every position point received by the receiving module 331.

According to another example of the present disclosure, the replaying device 230 may, as shown in FIG. 3, further include a converting module 333. Namely, the replaying device 230 may include the receiving module 331, the replaying module 332 and the converting module 333.

The receiving module 331 may obtain the information of every position point in six-axis coordinates from the PLC.

The converting module 333 may convert the information of every position point in six-axis coordinates to information of every position point in Cartesian coordinates.

The replaying module 332 may replay the historical movement of the robot according to the information of every position point in Cartesian coordinates.

In above mentioned embodiment, the controller 320 may be a PLC, and the replaying device 330 may be a digital twin device.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules.

Figure 4:
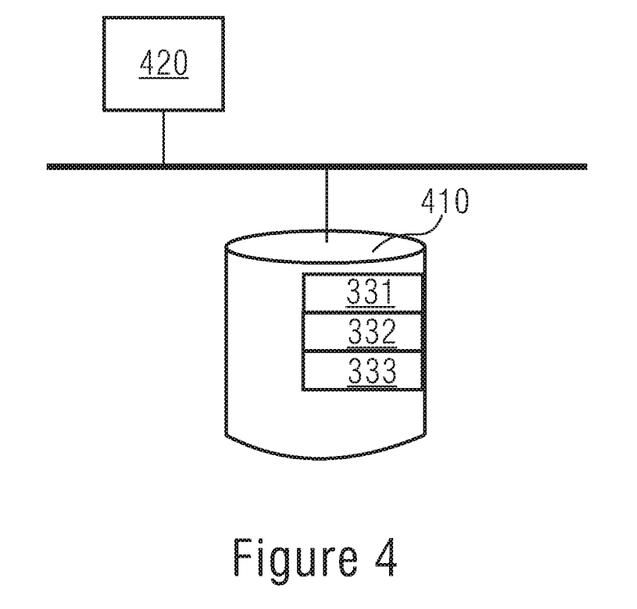
FIG. 4 is a schematic diagram illustrating a replaying device according to an embodiment of the present disclosure.

For example, FIG. 4 is a schematic diagram illustrating a replaying device according to another embodiment of the present disclosure. As shown in FIG. 4, the replaying device may include a memory 410 and a processor 420 in communication with the memory 410. The memory 410 stores a group of machine-readable instructions which may be executed by the processor 420 to achieve the above mentioned method for replaying movement of a robot shown in FIG. 2. Or, it may be understood that, in one example, the machine-readable instructions include the modules in the replaying device 330.

Figure 5:
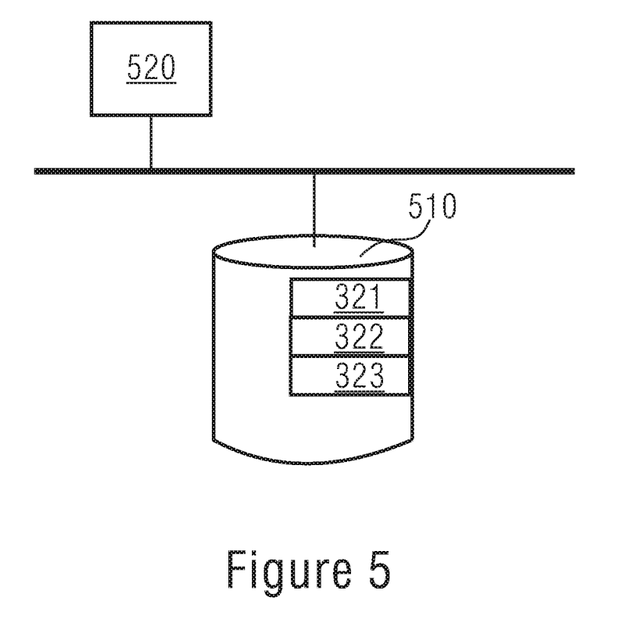
FIG. 5 is a schematic diagram illustrating a controller according to an embodiment of the present disclosure.

For example, FIG. 5 is a schematic diagram illustrating a controller according to another embodiment of the present disclosure. As shown in FIG. 5, the controller may include a memory 510 and a processor 520 in communication with the memory 510. The memory 510 stores a group of machine-readable instructions which may be executed by the processor 520 to achieve the above mentioned method for replaying movement of a robot shown in FIG. 1. Or, it may be understood that, in one example, the machine-readable instructions include the units in the controller 320.

The present disclosure provides a non-transitory computer readable storage medium having stored therein one or more instructions, which, when executed by a computing device, cause the computing device to achieve the above mentioned method for replaying movement of a robot. In particular, it may provide a system or apparatus equipped with a storage medium on which software program codes for realizing the functions of any of the above-described embodiments are stored, and a computer (or a CPU or an MPU of the system or apparatus)) reads out and executes the program code stored in the storage medium. In this case, the program code itself read from the storage medium can realize the function of any one of the above-described embodiments, and thus the program code and the storage medium storing the program code constitute a part of the present disclosure. The non-transitory computer readable storage medium includes a hard disk, a floppy disk, a magnetic disk, a compact disk (e.g., CD-ROM, CD-R, CD-RW, DVD-ROM, DVD-RAM, DVD-RW and DVD+ RW), a tape, a Flash card, ROM, and so on. Optionally, it is possible to download the program codes from a server computer via a communication network.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for replaying movement of a robot, comprising:
   receiving, by a controller, a log file in which information about a movement of the robot is recorded;
   obtaining, by the controller, information of position points passed by the robot when performing the movement based on the log file; and
   sending, by the controller, the information of position points passed by the robot when performing the movement to a replaying device, such that the replaying device replays the movement of the robot according to the information of position points.

2. The method for replaying movement of a robot of claim 1, wherein obtaining further comprises:
   classifying, by the controller, the information passed by the robot when performing the movement, in the log file into at least one motion command class according to at least one motion command for controlling the robot to perform at least one motion in the information about the movement of the robot in the log file;
   converting, by the controller, the at least one motion command into robot movement information about a movement trajectory with a start point and an end point; and
   calculating, by the controller, information of position points between the start point and the end point according to the robot movement information.

3. The method for replaying movement of a robot of claim 2, wherein each of the at least one motion command class comprises: a motion type of a motion command, a velocity, an acceleration and a jerk of the robot when performing the motion command, a coordinate type, a start point and an end point of the motion command.

4. The method for replaying movement of a robot of claim 1, wherein information of a position point, of the position points, comprises: a coordinate position of the position point, a velocity, an acceleration and a jerk of the robot when moving to the position point.

5. The method for replaying motion of a robot of claim 1, further comprising:
   a log loader obtaining the log file in structured format, converting the log file from structured format to binary format, and providing the log file in binary format to the controller.

6. The method for replaying movement of a robot of claim 1, wherein the controller is a Programmable Logic Controller PLC, and the replaying device is a digital twin device.

7. A method for replaying movement of a robot, comprising:
   receiving information of position points passed by the robot when performing the movement from a controller, at a replaying device, wherein the information of position points passed by the robot when performing the movement is obtained by the controller based on a log file in which information about a movement of the robot is recorded; and
   replaying the movement of the robot, at the replaying device, according to the information of position points passed by the robot when performing the movement.

8. The method for replaying movement of a robot of claim 7, wherein the information of position points received by the replaying device is information of position points in six-axis coordinates and wherein the method further comprises:
   converting, at the replaying device, the information of position points in six-axis coordinates to information of position points in Cartesian coordinates, and
   wherein the replaying the movement of the robot according to the information of position points further includes replaying the movement of the robot according to the information of position points in Cartesian coordinates.

9. The method for replaying movement of a robot of claim 7, wherein information of one position point, of the position points, comprises a coordinate position of the position point, a velocity, an acceleration and a jerk of the robot when moving to the position point.

10. The method for replaying movement of a robot of claim 7, wherein the replaying device is a digital twin device, and the controller is a Programmable Logic Controller.

11. A device for replaying movement of a robot, comprising:
   a memory; and
   a processor in communication with the memory, wherein, the memory stores a group of machine-readable instructions, executable by the processor, to perform the method for replaying movement of a robot of claim 1.

12. The method for replaying movement of a robot of claim 8, wherein information of one position point, of the position points, comprises a coordinate position of the position point, a velocity, an acceleration and a jerk of the robot when moving to the position point.

13. The method for replaying movement of a robot of claim 8, wherein the replaying device is a digital twin device, and the controller is a Programmable Logic Controller.

14. A device for replaying movement of a robot, comprising:
   a memory; and
   a processor in communication with the memory, wherein, the memory stores a group of machine-readable instructions, executable by the processor, to perform the method for replaying movement of a robot of claim 7.

* * * * *